US012406557B2

(12) United States Patent
Wells et al.

(10) Patent No.: US 12,406,557 B2
(45) Date of Patent: Sep. 2, 2025

(54) MOBILE GUNSHOT DETECTION DEVICES AND SYSTEMS

(71) Applicant: SHELLBACK SURVIVAL SYSTEMS, LLC, League City, TX (US)

(72) Inventors: Taylor Wells, League City, TX (US); Lee David Buckland, Round Rock, TX (US)

(73) Assignee: SHELLBACK SURVIVAL SYSTEMS, LLC, League City, TX (US)

( * ) Notice: Subject to any disclaimer, the term of this patent is extended or adjusted under 35 U.S.C. 154(b) by 13 days.

(21) Appl. No.: 18/324,464

(22) Filed: May 26, 2023

(65) Prior Publication Data

US 2023/0394946 A1 Dec. 7, 2023

Related U.S. Application Data

(60) Provisional application No. 63/368,263, filed on Jul. 13, 2022, provisional application No. 63/365,803, filed on Jun. 3, 2022.

(51) Int. Cl.
*G08B 13/16* (2006.01)
*G08B 21/02* (2006.01)

(52) U.S. Cl.
CPC ..... *G08B 13/1672* (2013.01); *G08B 21/0297* (2013.01)

(58) Field of Classification Search
CPC .................................................. G08B 13/1672
See application file for complete search history.

(56) References Cited

U.S. PATENT DOCUMENTS

| | | | | |
|---|---|---|---|---|
| 6,552,963 | B2 | 4/2003 | Baranek et al. | |
| 9,240,114 | B2 | 1/2016 | Showen et al. | |
| 9,251,695 | B2 | 2/2016 | McNutt et al. | |
| 9,380,397 | B2 | 6/2016 | Kane et al. | |
| 9,846,007 | B2 | 12/2017 | Young et al. | |
| 10,054,576 | B2 | 8/2018 | Overcast | |
| 10,332,326 | B2 * | 6/2019 | Penland | G08B 13/19695 |
| 10,598,756 | B2 | 3/2020 | Sloan | |
| 10,789,831 | B1 | 9/2020 | Dahm et al. | |
| 10,810,845 | B2 * | 10/2020 | Coles | G08B 13/19619 |
| 11,170,619 | B2 | 11/2021 | Connell et al. | |
| 2002/0003470 | A1 | 1/2002 | Auerbach | |
| 2006/0042142 | A1 | 3/2006 | Sinha | |

(Continued)

OTHER PUBLICATIONS

Berce, Tech Deep Dive: Gunshot Detection—How the products work and integrate with other systems (Jun. 12, 2019).

(Continued)

*Primary Examiner* — Brian A Zimmerman
*Assistant Examiner* — Cal J Eustaquio
(74) *Attorney, Agent, or Firm* — Fishman Stewart PLLC; Cecily Anne O'Regan; Jeong Hee Seo

(57) ABSTRACT

Devices, systems and methods for identifying a gunshot occurrence. Microphone, location, and movement data are acquired from a mobile device and provided to a central server. Based on a criterion, a determination is made as to whether a gunshot has been produced and whether the user is in motion. Data from a plurality of sources is compiled and provided to a monitor for a secondary user. A user can press a button to call for help.

20 Claims, 8 Drawing Sheets

(56) References Cited

U.S. PATENT DOCUMENTS

| | | | |
|---|---|---|---|
| 2014/0218518 A1 | 8/2014 | Oliver | |
| 2015/0070166 A1 | 3/2015 | Boyden et al. | |
| 2015/0347079 A1 | 12/2015 | Price et al. | |
| 2016/0055164 A1* | 2/2016 | Cantarero | G06F 16/447<br>707/740 |
| 2020/0037142 A1 | 1/2020 | Lofton | |
| 2020/0191613 A1* | 6/2020 | Englund | G08B 13/1672 |
| 2022/0094381 A1 | 3/2022 | D'Amico | |
| 2023/0228832 A1* | 7/2023 | Kozyr | G10L 17/04<br>367/124 |

OTHER PUBLICATIONS

Newswire, V5 Systems' portable V5 Acoustic Gunshot Sensor that sends a validated alert within 3 seconds wins 2018SSI MVP award: (2018).

* cited by examiner

MOBILE GUNSHOT DETECTION DEVICES AND SYSTEMS

CROSS-REFERENCE

This application claims the benefit of U.S. Provisional Application No. 63/365,803, filed Jun. 3, 2022, entitled MOBILE GUNSHOT DETECTION DEVICES and U.S. Provisional Application No. 63/368,263, filed Jul. 13, 2022, entitled MOBILE GUNSHOT DETECTION DEVICES AND SYSTEMS, which applications are incorporated herein in their entirety by reference.

BACKGROUND

There are many factors that can lead to a situation where an individual decides to use a firearm to injure innocent people. The United Stated Federal Bureau of Investigation (FBI) published findings in 2014 and 2018 indicating that in the weeks and months before an attack, many active shooters engage in behaviors that may signal impending violence. Others point to the need for additional gun control laws. Whether or not understanding pre-attack observations or implementing additional gun control laws will be effective, the reality is that law enforcement needs real-time precision solutions to assist in the event of an active shooter situation to reduce casualties and mortalities because active shooter incidents are often unpredictable and evolve quickly.

What is needed are devices, systems and methods that provide real-time indoor or outdoor gunshot detection, location detection and data correlation with other data sources. What is also needed is an automatic emergency alerting system.

SUMMARY

Disclosed are devices, systems and methods that provide real-time indoor or outdoor gunshot detection, location detection and an automatic emergency alerting system in communication with the devices. The devices, systems and methods can also be used in communication with satellites to obtain satellite videos.

The systems, devices and methods are operable to provide policing solutions for law enforcement and security personnel in the event of an active shooter situation. A fixed or body worn gunshot detection device is provided that is operable to detect an indoor or outdoor gunshot and approximate gunshot location. The device is also operable to provide an automatic emergency alerting system. The systems and devices are designed to assist law enforcement and security personnel serving in an official capacity to mitigate risk to civilians and enhance security by automatically generating a notification of a potential gunfire incident in real-time. As would be appreciated by those skilled in the art, real-time and near real-time reporting saves critical minutes for first responders to accurately arrive at a location, isolate the threat, and save lives. The systems and devices are also operable in combination with software to provide a cloud-based investigative platform to assist law enforcement agencies working together with software tools.

Both the foregoing general description and the following detailed description are exemplary and explanatory only and are not restrictive of the disclosed embodiments, as claimed.

INCORPORATION BY REFERENCE

All publications, patents, and patent applications mentioned in this specification are herein incorporated by reference to the same extent as if each individual publication, patent, or patent application was specifically and individually indicated to be incorporated by reference.

U.S. Pat. No. 6,552,963 B2 issued Apr. 22, 2003 by Baranek et al.;
U.S. Pat. No. 9,240,114 B2 issued Jan. 19, 2016 by Showen et al.;
U.S. Pat. No. 9,251,695 B2 issued Feb. 2, 2016 by McNutt et al.;
U.S. Pat. No. 9,380,397 B2 issued Jun. 28, 2016 by Kane et al.;
U.S. Pat. No. 9,846,007 B2 issued Dec. 19, 2017 by Young et al.;
U.S. Pat. No. 10,054,576 B2 issued Aug. 21, 2018 by Overcast;
U.S. Pat. No. 10,598,756 B2 issued Mar. 24, 2020 by Sloan;
U.S. Pat. No. 10,789,831 B1 issued D Sep. 29, 2020 by Dahm et al.
U.S. Pat. No. 11,170,619 B2 issued Nov. 9, 2021 by Connell et. al.
US 2002/0003470 A1 published Jan. 10, 2002 by Auerbach;
US 2006/0042142 A1 published Mar. 2, 2006 by Sinha;
US 2014/0218518 A1 published Aug. 7, 2014 by Oliver;
US 2015/0070166 A1 published Mar. 12, 2015 by Boyden et al.;
US 2015/0347079 A1 published Dec. 3, 2015 by Price et al.;
US 2020/0037142 A1 published Jan. 30, 2020 by Lofton; and
US 2022/0094381 A1 published Mar. 24, 2022 by D'Amico.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
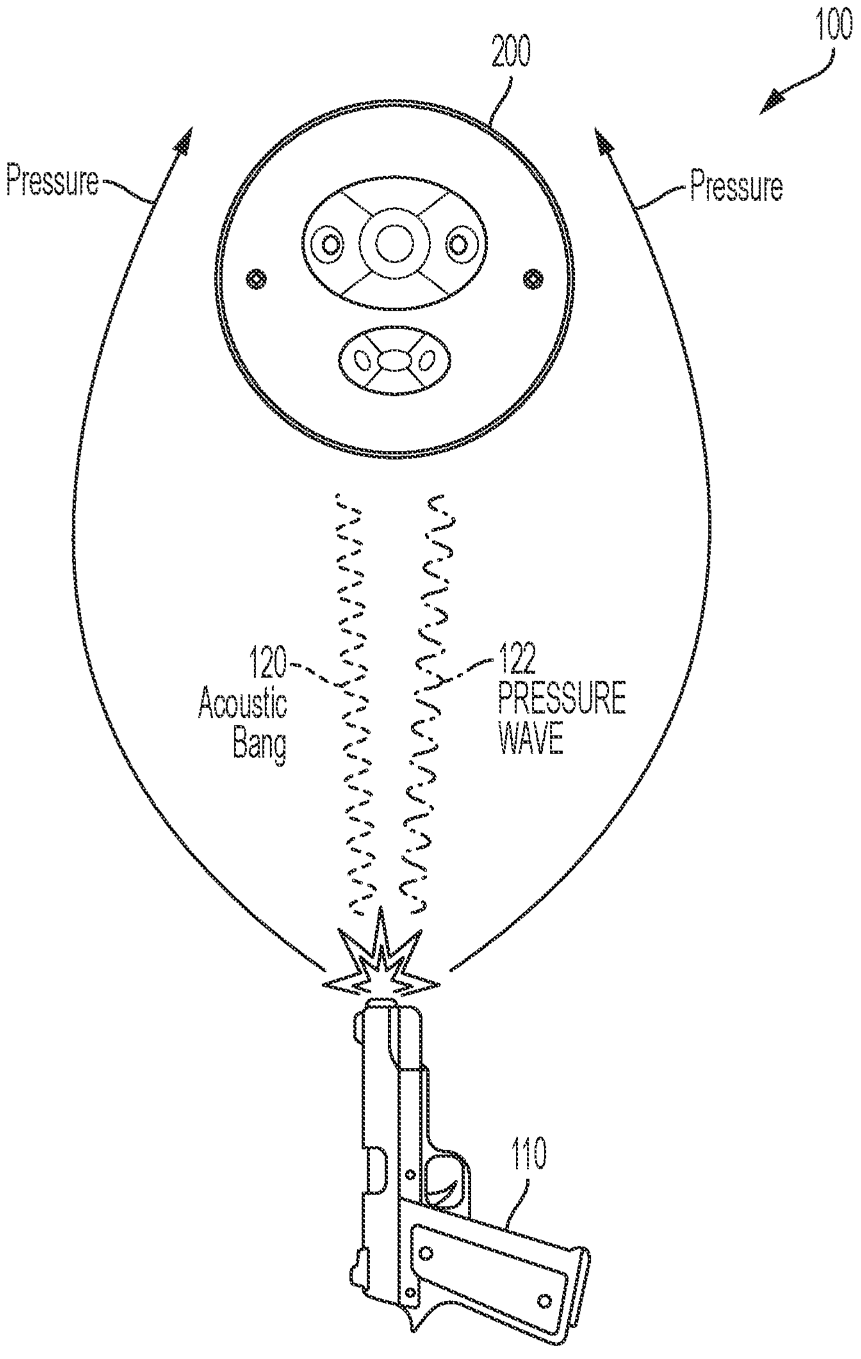
FIG. 1 illustrates a firearm interacting with gunshot detection device.

The disclosed devices are configurable to be a fixed or body worn piece of equipment attached to a user, such as a law enforcement officer (LEO). The disclosed gunshot detection devices are similar to a body worn camera in size and shape, having a length of from 2 inches to 4 inches, a height of from 2 inches to 4 inches, a thickness of from 0.5 inches to 2 inches and a weight of from 5 ounces to 8 ounces. The gunshot detection device can be equipped with highly specific sensors (Microphone(s), IR Sensor, Pressure Sensor Accelerometer, Gyroscope, Temperature Sensor) operable to automatically detect direct or indirect gunfire. Detected sound is then analyzed utilizing artificial intelligence (AI) and algorithms to eliminate or reduce human error. Once sound is detected and determined to be a gunshot. A the decision can be made by the device. In an alternate configuration, information is sent to a central server for analysis and the decision is sent to the device. The gunshot detection device is configurable to send an audible and visual alert to, for example, a dispatch center associated with the user of the gunshot detection device and to the nearest police or sheriff station. The gunshot detection device has a data transmitter that provides transmitted information with current GPS coordinates to a remote server. A detailed map view can also be provided with the information. Information is provided in real-time, or near real-time, via or Cellular Data (User Interface-In car computer/phone app). In the event that gunshots are detected and the gunshot detection device does not detect movement from the user or detects a fall by the user, a secondary emergency alert can be sent out stating "No movement detected" or "fall detected. Possible officer down.". The gunshot detection device and software is configurable to communicate with neighboring agencies/counties. In some configurations, a high definition camera is included as part of the gunshot detection device. In another configuration, the gunshot detection device is in communication with a body worn camera. The gunshot detection device can also be equipped with a easy to reach self-initiated emergency alert button, in the event the user cannot utilize his/her radio or cannot speak due to unknown or medical emergency all it takes is the simple press of a button. If the gunshot detection device remains inactive for a period of time, the user's gunshot detection device is configurable to send a notification to the user, such as a chirp and the alarm will need to be silenced by the user, if the alarm is not silenced by the user, an alert is transmitted to a central location and other user's in the area as "no movement detected" or "no response detected." The interface is encrypted and there is a space where a user can share information. Additionally, case discussion forums and bolo's for specific State/City/or Department(s) can be entered which is available throughout the network. The system can also be configured to alert more than one agency when more than one agency may have jurisdiction or in situations where an event is occurring within a set distance from a boundary between one jurisdiction and another jurisdiction. Moreover configurations to alert a secondary agency can be customized by the primary agency implementing the technology.

FIG. 1 illustrates a firearm 110 interacting with gunshot detection device 200. The firearm 110 can be any kind of firearm, including but not limited to, handguns, shotguns, assault weapons, etc. When a firearm 110 is discharged, there is often an acoustic bang 120 and a pressure wave 122. Pressure resulting from either or both of the acoustic bang 120 and/or the pressure wave 122 is detected by the gunshot detection device 200. Pressure is sensed from the concussion of the gunshot via, for example, a differential air pressure sensor.

Figure 2A:
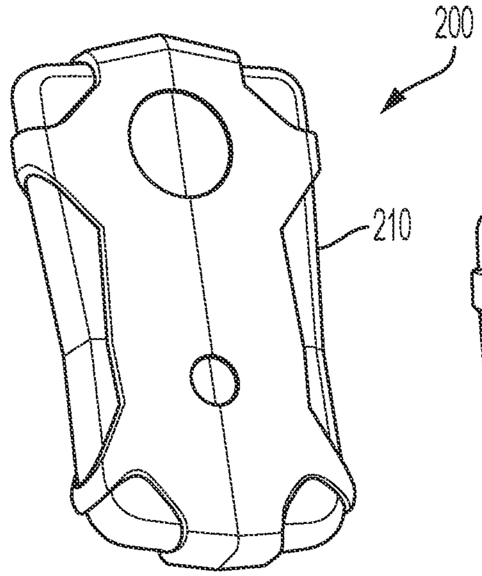
FIGS. 2A-C illustrate a perspective view of a gunshot detection device, a front surface view of a gunshot detection device, and a side view of a gunshot detection device.
Figure 2B:
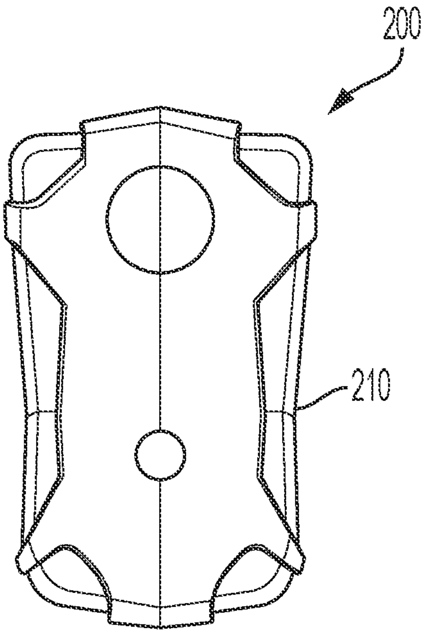
Figure 2C:
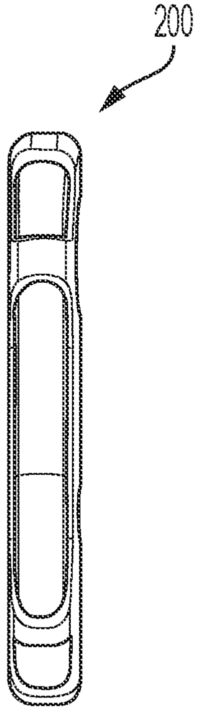

FIGS. 2A-C illustrate a perspective view of a gunshot detection device 200, a front surface view of a gunshot detection device 200; and a side view of a gunshot detection device 200. The gunshot detection device 200 has a housing 210. The housing is configured to house the components of the device including, but not limited to: a sound detector, a light detector, a GPS sensor, a memory, an ASIC, a power source (such as a battery), a camera, a speaker, a pressure sensor, etc.

Figure 3:
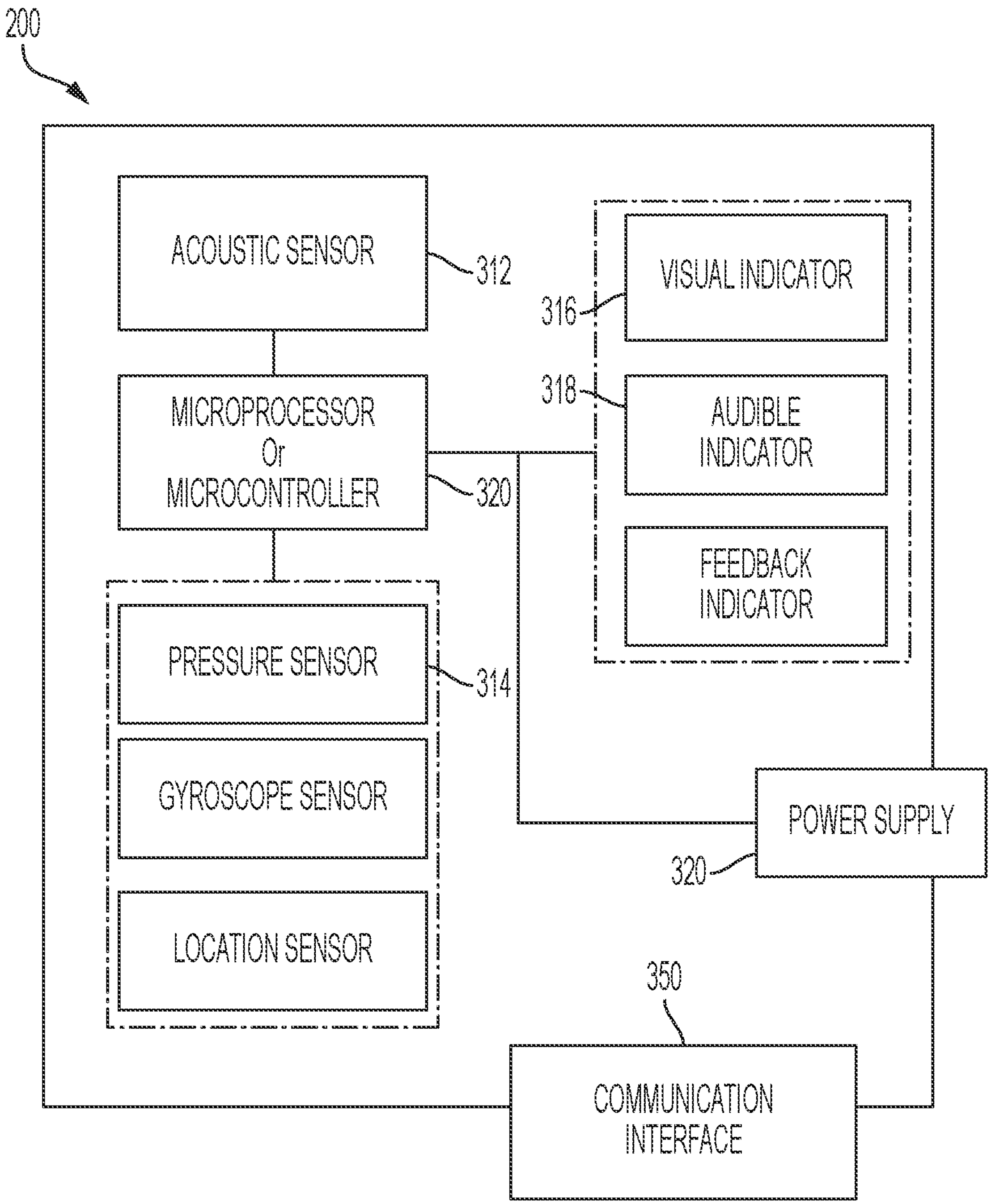
FIG. 3 is a block diagram of functional elements of an exemplar gunshot detection device.

FIG. 3 illustrates a block diagram of a gunshot detection device 200 with components. The gunshot detection device 200 has one or more of a microprocessor or microcontroller 320, an acoustic sensor 312, a pressure sensor 314, a gyroscope sensor, a location sensor or location detector (e.g., a GPS receiver), a visual indicator 316 (such as a light), an audible indicator 318 (such as a speaker), a feedback indicator, speaker, on/off button, assistance request button, and a power supply 340 (such as a battery). The acoustic sensor 312 collects and provides audible data. The gyroscope sensor is operable to measure an orientation and angular velocity of the gunshot detection device. A communication interface 350 can also be provided which allows the gunshot detection device 200 to communicate with a second device (such as a phone) or a central station. The location sensor provides location data, such as GPS coordinates.

Figure 4A:
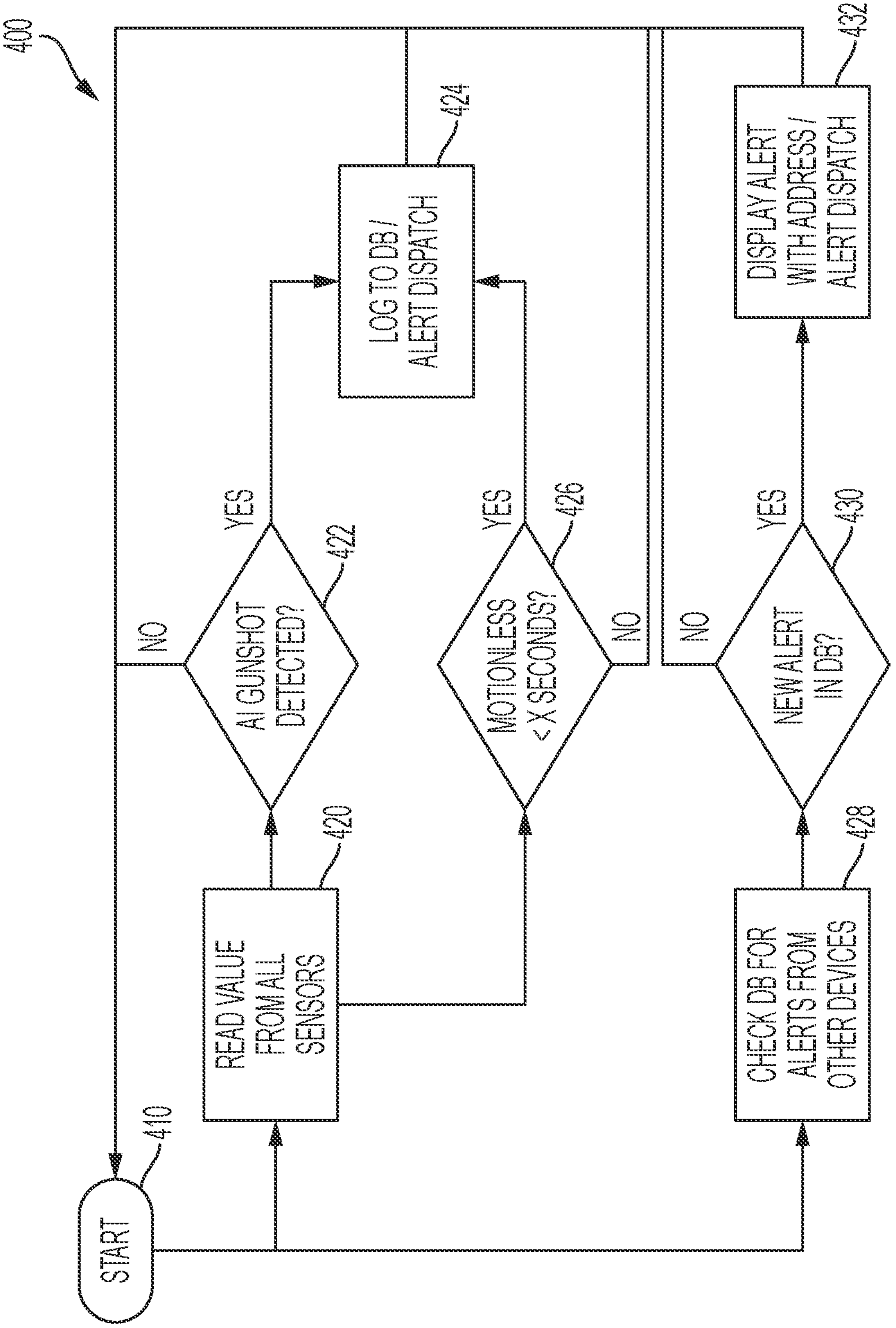
FIG. 4A is a flow diagram illustrating an operation of a gunshot detection device in an on condition.

FIG. 4A is a flow diagram illustrating an operation 400 of a gunshot detection device in an on condition. Once the gunshot detection device 200 is powered on, the process starts 410 and begins monitoring. The gunshot detector then reads values from all sensors 420. The AI analyzes the detected information from one or more sensors to determine if a gunshot has been detected 422. If no gunshot is detected (NO), then the gunshot detection device returns to a monitoring status. If a gunshot is detected (YES), then a log is sent to a database and an alert is sent to a central location 424, such as a dispatch center.

During the process of reading and analyzing values from the one or more sensors 420, the system also determines whether the user has been motionless for a period of time exceeding a threshold 426. A suitable threshold is, for example, 15-30 minutes for inactivity. If the user has been motionless for a period of time exceeding the set threshold (YES), the a log is sent to a database and an alert is sent to a central location 424. If motion is detected (YES), then the gunshot detection device returns to a monitoring status. The motion detection can include detection of the rise and fall of a chest with breathing along with motion associated with walking, running or falling. Additionally, the gunshot detection device can be calibrated to the individual breathing pattern of a specific user. During the monitoring process, the system also checks the database for alerts from other devices within a defined geographic area 428 or geographic range. The geographic area can be set by the user or the issuer of the gunshot detection device and information from about the GPS location for a particular gunshot detection device. The system determines if there is a new alert in the database 230. If there is an alert (YES), then the alert is provided to the gunshot detection device 432. The gunshot detection device can display the alert via a screen and/or via an audible dispatch delivered by a speaker. The display operates as a control panel to allow the user of the remote computer to track the event real-time and provide feedback to one or more personnel located in a target geographic area.

Figure 4B:
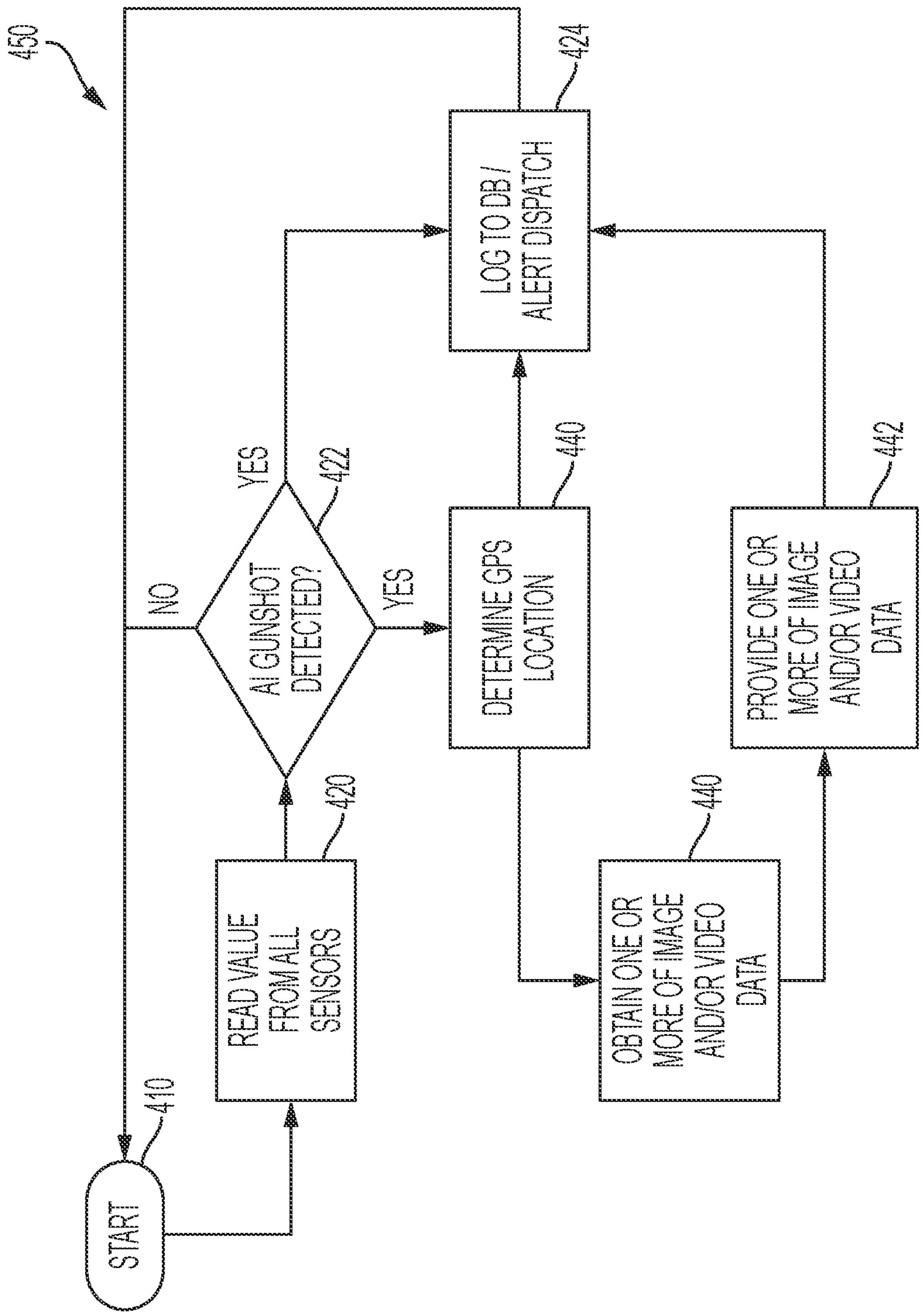
FIG. 4B is a flow diagram illustrating operation of the system in communication with a satellite based on GPS location.

FIG. 4B is a flow diagram illustrating an operation 450 of a gunshot detection device in an on condition. Once the gunshot detection device 200 is powered on, the process starts 410 and begins monitoring. The gunshot detection device 432 then reads values from one or more sensors 420. The AI determines if a gunshot has been detected 422. If no gunshot is detected (NO), then the gunshot detection device returns to a monitoring status. If a gunshot is detected (YES), then a log is sent to a database and an alert is sent to a central location 424, such as a dispatch center. When the gunshot is detected the system determines the GPS location 440 of the gunshot detection device 200. The system then determines data available from any and all live videos, including, but not limited to satellite video, closed circuit television video (CCTV), networked public or private security system videos and/or social media sites to obtain one or more images, videos, and/or audio feeds. The system then communicates directly, or indirectly, with one or more of the identified available satellite, closed circuit television (CCTV), networked public or private security systems and/or social media site to obtain one or more images, videos, and/or audio feeds. Additionally the system is integratable with an alert management or notification system.

The use of social media data can be filtered to provide contemporaneous and geographically relevant social media content, including text and video. The proximity of, for example, CCTV footage can be determined by determining the GPS coordinates of the detected gunshot and the GPS coordinates for one or more CCTV systems. The images, videos and/or audio are provided to one or more of the user of the gunshot detection device 200, either at the gunshot detection device or a mobile device associated with the user of the gunshot detection device, and/or a central location 424 such as a dispatch. In some circumstances, it may be desirable to present or identify images, videos and/or audio for nearby locations. Thus, for example, identifying a located for a detected gunshot and then monitoring nearby CCTV footage which may be a location that would be passed by a perpetrator fleeing the scene.

Figure 5:
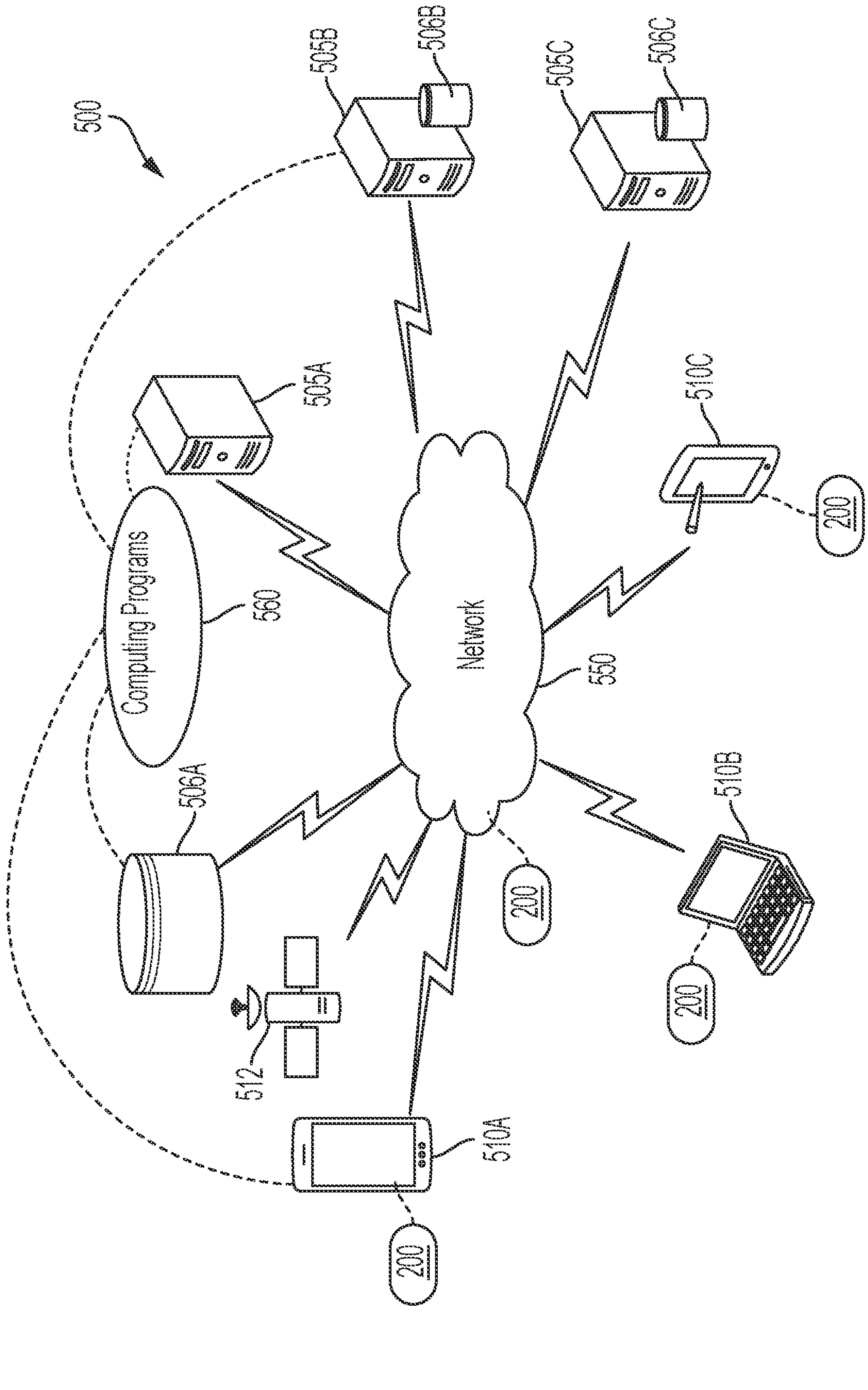
FIG. 5 is a diagram of an exemplar network environment for the exemplar gunshot detection device.

FIG. 5 illustrates a diagram of an exemplar client-server network environment 500 to implement the disclosed systems and methods. An application is provided that can be resident on a client device, such as smart phone 510A, laptop 510B, or personal digital assistant/tablet computer 510C. Each client device has a user interface and display and is operable to communicate over a network 550 with one or more servers, 505A, 505B, 505C and associated databases 506A, 506B, 506C. As will be appreciated by those skilled in the art, other client devices can be used without departing from the scope of the disclosure. The gunshot detection device 200 is configurable to communicate with any of the client devices which in turn communicates with the network and one or more servers and databases, or directly with the network and one or more servers and databases.

The client-server network 500 is configurable to enable a user of a client device, such as client devices 510A-510C, to implement the system, including, but not limited to, receiving information from the gunshot detection device 200; interfacing/communicating with support networks; entering or receiving information, displaying information to a user consistent with a location. The client devices such as a smart phone 510A, laptop 510B, personal digital assistant/tablet computer 510C may also use a browser to execute the application or may have a device resident application executed by the client device scripted to run the system and cooperate or communicate with a remote server or computer. The network is also configurable to communicate with one or more satellites 512 to obtain, for example, images and/or video based on a GPS location of the device.

A database, such as a first database 506A, can be provided that stores one or more attributes of the system. When a server, such as the first server 505A, is an internet website, the server may be comprised of at least one or more servers and cooperating databases. The platform enables information conveniently and efficiently from any number of locations. One or more modules, such as a client application on the mobile client device or server applet resident on the server, may be configured to present an interface to support the intake and output of information for one or more of the functions described herein. The client application may have code scripted to present one or more user interface templates that may be user customizable, have one or more prompted input fields, and/or is configured to work with a browser and a remote server. The server applet works with a browser application resident on the client device and serves one or more web pages to the client device with the resident browser. Communication with remote devices, servers, computers, users, mobile devices, databases, etc. may be in real time or may be at periodic intervals as dictated by the needs and associated functions of the communicated information.

Each client device 510A-510C can communicate information received over the network to the server 505A-505C potentially located on the world wide web via a computer-implemented system. A software program resident on the server, such as the first server 505A, is operable to receive the entered details from a user or sensor. A backend server is further operable to aggregate the received information. Information can then be passed to one or more databases. The server may be used to communicate and update information stored in the database and communicate to or with one or more associated users in response to the received information. Thus, a software program resident on the server is coded to take in the details from one or more users, assess the information received, and perform specific functions in response to the received information. The server may then supply information back to each client device to be displayed on a display screen of that client device or gunshot detection device as well as supply information back to one or more other networked users. The web application on the server can cooperate over a wide area network, such as the Internet or a cable network, with two or more client machines each having resident applications.

The software used to facilitate the protocol and algorithms associated with the disclosed processes can be embodied onto non-transitory machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. Any portion of the server implemented in software and any software implemented on the client device are both stored on their own computer readable medium in a non-transitory executable format. Embodiments described herein, such as modules, applications, or other functions may be configured as hardware, software, or a combination thereof. The configuration may be stored one a single dedicated device such as an application locally resident and executed on client devices 510A-510C configured to communicate over a network or across many devices such as a website hosted across one or more servers 505A-C retrieving information across one or more databases 506A-C, to communicate across a network 550 to a local device, such as laptop 510B, or any combination thereof. Embodiments may also take advantage of cloud computing, such that the exemplary modules, applications, or other functions are stored remotely on one or more servers or devices, and accessed over a network such as the internet or other network connection from an electronic device, such as a mobile device.

Figure 6A:
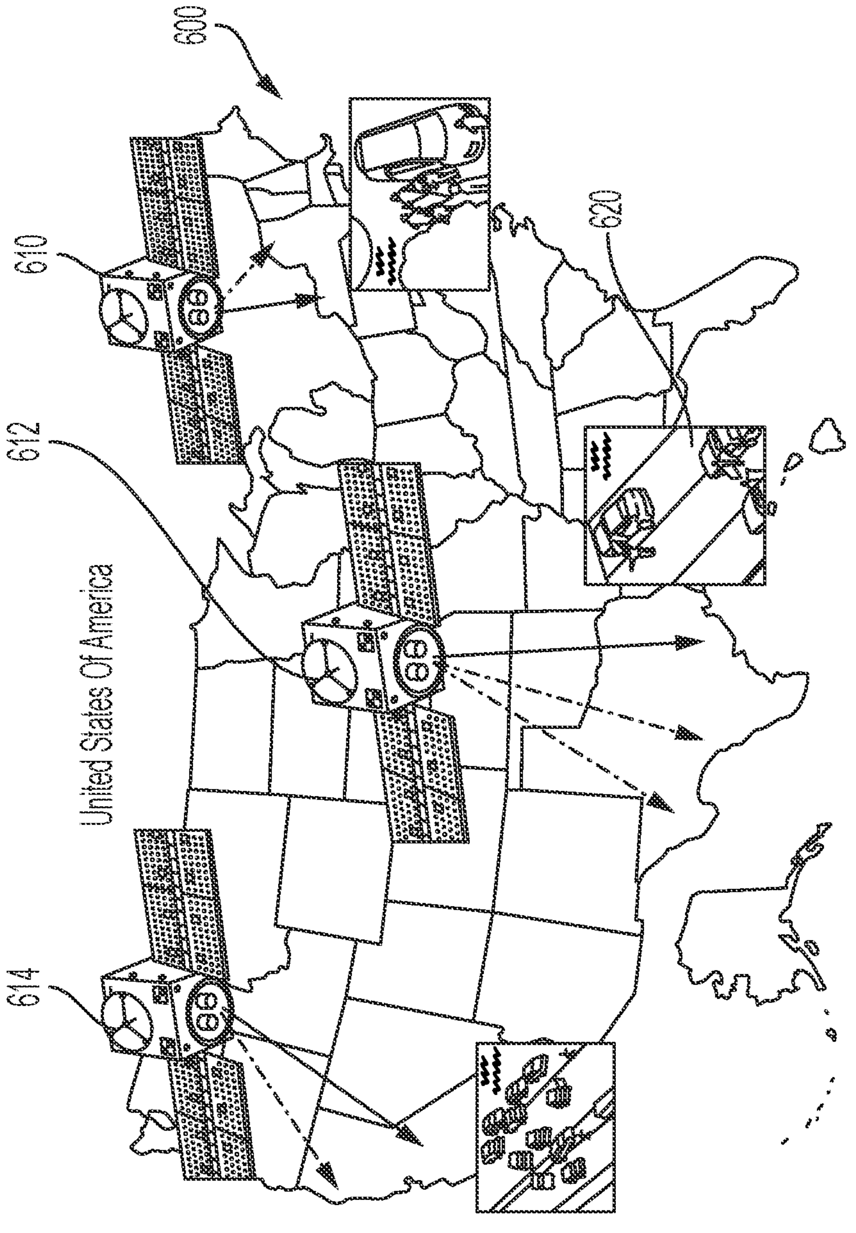
FIGS. 6A-B illustrate a map of a geographic area with satellite communications to specific geographic areas and an image of data received from the satellite triggered by the gunshot detection device and a user dashboard.
Figure 6B:
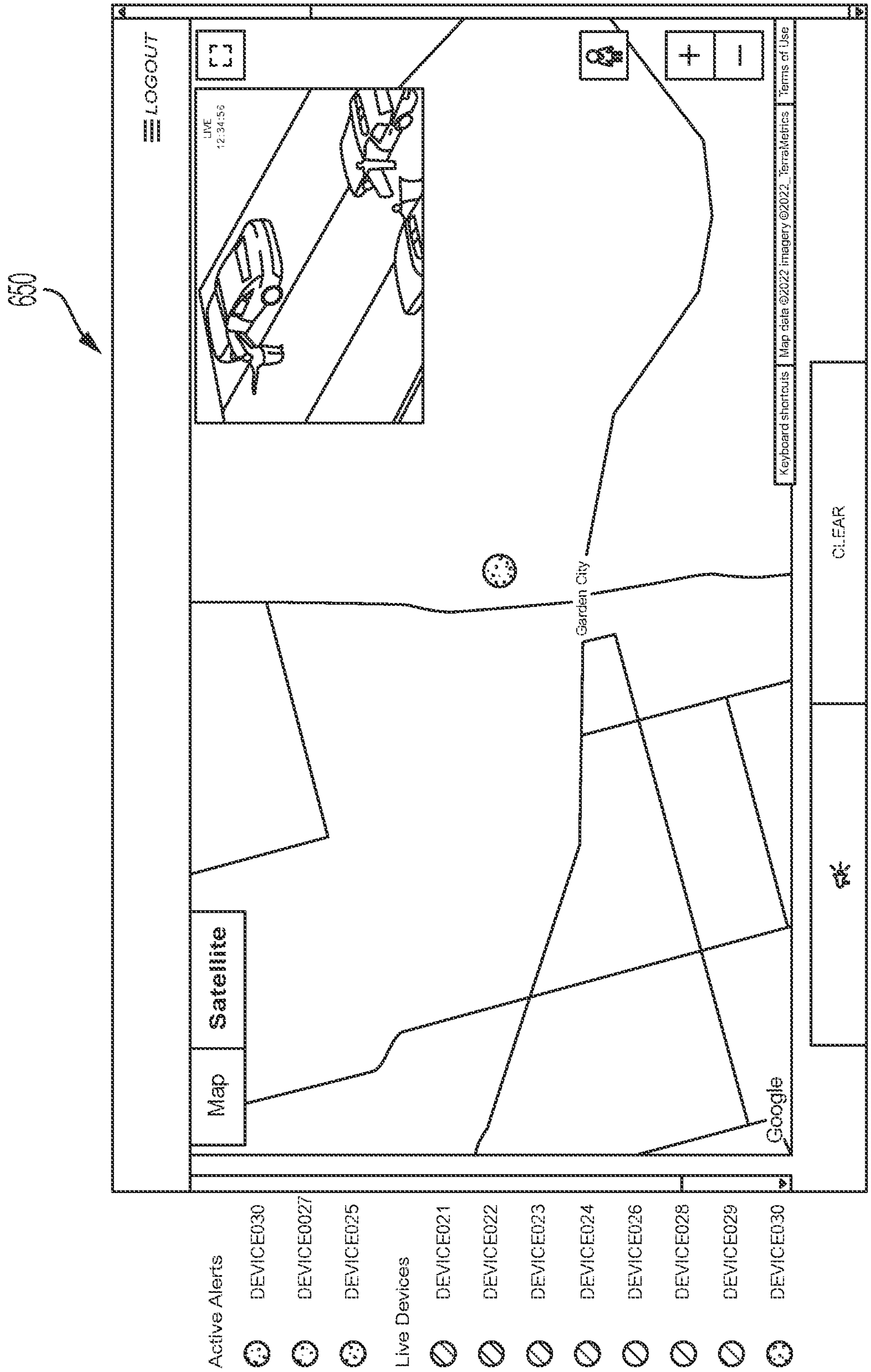

FIG. 6A is an image of a geographic area 600, such as the United States, with a plurality of satellites 610, 612, 614 providing video and/or image data 620 to a specific location based on GPS. FIG. 6B is an image of, for example, a dispatch dashboard 650 with active alerts and satellite and/or map data available for a selected active alert.

Example 1

Audible data is received from a first gunshot detection sensor. A determination is made whether the audible data is a gunshot. Once the presence of a gunshot is confirmed, the system determines a location and data availability for one or more of, one or more second gunshot detection devices, and one or more networked public or private video surveillance systems. The compiled information is provided via the remote server to a dispatcher as shown in FIG. 6B. The user of the remote computer monitoring the event can dynamically change the time and location parameters (e.g., defined range of the data collected from the geographic location of the detected gunshot) of the available videos as desired.

Example 2A

Audible data is received from a first gunshot detection sensor. A determination is made whether the audible data is a gunshot. Once the presence of a gunshot is confirmed, the system determines whether contemporaneous social media posts are available. The system can be structured to include social media posts that are geo location tagged within an preliminary defined area and/or posts that have occurred within a defined time frame from the time of the gunshot. The compiled information is provided via the remote server to a dispatcher as shown in FIG. 6B.

Example 2B

Audible data is received from a first gunshot detection sensor. A determination is made whether the audible data is a gunshot. Once the presence of a gunshot is confirmed, the system determines whether contemporaneous social media posts are available. The system can be structured to include social media posts that are geo location tagged within an preliminary defined area and/or posts that have occurred within a defined time frame from the time of the gunshot. The user of the remote computer monitoring the event can dynamically change the time and location parameters of the social media post display as desired. The compiled information is provided via the remote server to a dispatcher as shown in FIG. 6B.

Example 3

Audible data is received from a first gunshot detection sensor. A determination is made whether the audible data is a gunshot. Once the presence of a gunshot is confirmed, the system determines a map location from a location detector data, a movement direction from a motion detector data, and a response indicator based on a determination of whether the manually activatable one-way notification button has been activated. If the one-way notification button has been activated an alarm or manual activation data is transmitted to the central servicer. The alarm can result in additional support being directed to the location.

Example 4

Audible data is received from a first gunshot detection sensor. A determination is made whether the audible data is a gunshot. Once the presence of a gunshot is confirmed, the system determines a map location from a location detector data, a movement direction from a motion detector data, and whether the mute button has been activated to prevent inadvertent identification of a location of the user by the shooter. If the mute button has been activated, additional support will be directed to the location with an indication that the user has muted his device.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that any claims presented define the scope of the invention and that methods and structures within the scope of these claims and their equivalents be covered thereby.

What is claimed:

1. A gunshot detection device comprising: a housing having a microprocessor, a plurality of sensors comprising two or more of an acoustic sensor, a microphone, a speaker, a motion detector, the motion detector further including detection of a rise and fall of a chest with breathing along with motion associated with walking, running or falling, the detection calibrated to an individual breathing pattern of a specific user, and a location detector; and a data transmitter, a power supply, a speaker, and a manually activatable one-way notification button, wherein when the microprocessor determines that the user associated with the gunshot detection device is stationary for more than a threshold time based on values from one or more of the plurality of sensors, the microprocessor generates a notification based on the determination that the user is stationary.

2. The gunshot detection device of claim 1, wherein the gunshot detection device is in communication with a remote server to transmit audible data from the acoustic sensor for analysis to detect a gunshot, location data of the gunshot detection device, movement data for the gunshot detection device, and upon receipt of manual activation data from the one-way notification button, wherein the remote server is configured to:

determine a map location from a location detector data, a movement direction from a motion detector data, and a response indicator based on a determination of the manually activatable one-way notification button has been activated, determine a location and data availability for one or more of, one or more second gunshot detection devices, and one or more networked public or private video surveillance systems, determine an availability of one or more satellite videos, determine an availability of a contemporaneous live video, and display on a screen one or more of the map location, the location and data from the one or more second gunshot detection devices within a defined geographic range of the gunshot detection device, a video from the one or more networked public or private video surveillance systems, at least one satellite video, a contemporaneous alert or notification from an alerting system, and a contemporaneous social media post.

3. The gunshot detection device of claim 1, is operable to communicate with a camera.

4. The gunshot detection device of claim 1, wherein the location detector is a GPS receiver.

5. The gunshot detection device of claim 1, wherein the motion detector has a gyroscope for measuring an orientation and angular velocity of the gunshot detection device.

6. A computer-implemented system for gunshot detection comprising:

(a) a gunshot detection device comprising a housing having a microprocessor, a plurality of sensors comprising two or more of an acoustic sensor, a microphone, a speaker, a motion detector, the motion detector further including detection of a rise and fall of a chest with breathing along with motion associated with walking, running or falling, the detection calibrated to the individual breathing pattern of a specific user, and a location detector, a data transmitter, a power supply, a speaker, and a manually activatable one-way notification button, wherein when the microprocessor determines that the user associated with the gunshot detection device is stationary for more than a threshold time based on values from one or more of the plurality of sensors, the microprocessor generates a notification based on the determination that the user is stationary; and (b) a processor operable to process a signal received from the acoustic sensor and the microphone, and wherein the computer-implemented system determines whether a gunshot has occurred, wherein the computer-implemented system determines a direction an-direction of the gunshot, and further wherein the computer-implemented system is configured to determine a map location from a location detector data, a movement direction from a motion detector data, and a response indicator based on a determination of the manually activatable one-way notification button has been activated, determine a location and data availability for one or more of, one or more second gunshot detection devices, and one or more networked public or private video surveillance systems, determine an availability of one or more satellite videos, determine an availability of a contemporaneous live video, and display on a screen one or more of the map location, the location and data from the one or more second gunshot detection devices within a defined geographic range of the gunshot detection device, a video from the one or more networked public or private video surveillance systems, at least one satellite video, a contemporaneous alert or notification from an alerting system, and a contemporaneous social media post.

7. The computer-implemented system for gunshot detection device of claim 6, wherein the gunshot detection is operable to communicate with a camera.

8. The computer-implemented system for gunshot detection device of claim 6, further wherein the motion detector has a gyroscope for measuring an orientation and angular velocity of the gunshot detection device.

9. The computer-implemented system for gunshot detection device of claim 8, wherein the gyroscope determines whether a wearer is in motion or stationary.

10. A system for detecting gunshots comprising: a gunshot detection device for detecting gunshots, the gunshot detection device comprising a housing having a plurality of sensors comprising two or more of an acoustic sensor, a microphone, a speaker;

a motion detector, the motion detector further including detection of a rise and fall of a chest with breathing along with motion associated with walking, running or falling, the detection calibrated to an individual breathing pattern of a specific user, a location detector, a data transmitter, a power supply, a speaker, and a manually activatable one-way notification button, a microprocessor, wherein when the microprocessor determines that the user associated with the gunshot detection device is stationary for more than a threshold time based on values from one or more of the plurality of sensors, the microprocessor generates a notification based on the determination that the user is stationary; and a control panel for receiving data from the gunshot detection device, wherein the control panel receives a map location from a location detector data, a movement direction from a motion detector data, and a response indicator based on a determination of the manually activatable one-way notification button has been activated, determine a location and data availability for one or more of, one or more second gunshot detection devices, and one or more networked public or private video surveillance systems, determine an availability of one or more satellite videos, determine an availability of a contemporaneous live video, and display on a screen one or more of the map location, the location and data from the one or more second gunshot detection devices within a defined geographic range of the location detector data, a video from the one or more networked public or private video surveillance systems, at least one satellite video, a contemporaneous alert or notification from an alerting system, and a contemporaneous social media post.

11. The system for detecting gunshots of claim 10, wherein the gunshot detection device is operable to communicate with a camera.

12. The system for detecting gunshots of claim 10, wherein the gunshot detection device further wherein the motion detector has a gyroscope for measuring an orientation and angular velocity of the gunshot detection device.

13. The system for detecting gunshots of claim 1, wherein the notification is an audible signal to the user.

14. The system for detecting gunshots of claim 13, further comprising a mute button, wherein when the microprocessor determines that the user fails to push the mute button in response to the audible signal, the microprocessor transmits an alert to a dispatch center using the data transmitter.

15. The system for detecting gunshots of claim 1, wherein the notification is an alert to a dispatch center transmitted via the data transmitter.

16. The computer-implemented system for gunshot detection device of claim 6, wherein the notification is an audible signal to the user.

17. The computer-implemented system for gunshot detection device of claim 16, further comprising a mute button, wherein when the microprocessor determines that the user fails to push the mute button in response to the audible signal, the microprocessor transmits an alert using the data transmitter.

18. The computer-implemented system for gunshot detection device of claim 6, wherein the notification is an alert to a dispatch center transmitted via the data transmitter.

19. The system for detecting gunshots device of claim 10, wherein the notification is an audible signal to the user.

20. The system for detecting gunshots of claim 19, further comprising a mute button, wherein when the microprocessor determines that the user fails to push the mute button in response to the audible signal, the microprocessor transmits an alert using the data transmitter.

* * * * *